United States Patent [19]
Klein et al.

[11] 4,147,240
[45] Apr. 3, 1979

[54] BRAKE DISC CONNECTION

[75] Inventors: Willi Klein, Remscheid; Henning Rocholl, Radevormwald, both of Fed. Rep. of Germany

[73] Assignee: Bergische Stahl-Industrie, Remscheid, Fed. Rep. of Germany

[21] Appl. No.: 583,800

[22] Filed: Jun. 4, 1975

[30] Foreign Application Priority Data

Jun. 4, 1974 [DE] Fed. Rep. of Germany ....... 2426952

[51] Int. Cl.$^2$ ............................................. F16D 65/12
[52] U.S. Cl. ............................ 188/218 XL; 192/70.16; 192/107 R
[58] Field of Search ....................... 188/73.2, 218 XL; 192/107 R, 70.13, 70.16

[56] References Cited

U.S. PATENT DOCUMENTS 1,789,133  1/1931  Bluhm .......................... 192/107 R X

FOREIGN PATENT DOCUMENTS

| 1945934 | 3/1971 | Fed. Rep. of Germany .... | 188/218 XL |
| 186827 | 12/1963 | Sweden .............................. | 188/218 XL |
| 752101 | 7/1956 | United Kingdom ............. | 188/218 XL |
| 1080035 | 8/1967 | United Kingdom ............. | 188/218 XL |
| 1080640 | 8/1967 | United Kingdom ............. | 188/218 XL |
| 1084183 | 8/1967 | United Kingdom ............. | 188/218 XL |

Primary Examiner—George E. A. Halvosa
Attorney, Agent, or Firm—Walter Becker

[57] ABSTRACT

A brake disc connection, especially for rail vehicles, in which the undivided brake ring or the brake ring divided along a radial or axial plane is by a clamping connection which includes a clamping groove and clamping strip clamped therein connected to the hub or wheel. The hub or the wheel as well as the brake ring are each provided with two clamping surfaces defining the clamping groove. These clamping surfaces are in alignment with each other in radial and/or axis parallel direction, and the clamping strip extends into both clamping grooves while being clamped thereinto; at least three pairs of clamping surfaces being provided for each brake ring, so that at least three of the above mentioned connections are provided for each brake ring.

2 Claims, 6 Drawing Figures

Strip yields for spring action

BRAKE DISC CONNECTION

The present invention relates to a brake disc for disc brakes, especially for rail vehicles, according to which the undivided brake ring and the divided brake ring divided along a radial and/or axial plane is by means of a clamping device by guiding strips clamped into a clamping groove connected to the brake disc hub or the wheel.

It is known to connect the brake disc to a hub or a wheel by providing one element—brake disc or wheel or hub—with clamping surfaces forming a clamping groove, whereas the other part is equipped with a guiding strip which is clamped into said clamping groove. Normally, at least three of such pairs are necessary for connecting a brake disc to the hub or a rail vehicle wheel. This connecting type has proved so satisfactory that a plurality of further developments have been effected according to which for instance the clamping grooves were arranged on intermediate rings and while the clamping grooves or the clamping surfaces forming same form a portion of a frame so that the clamping groove was no longer unilaterally open. In addition thereto, this frame was arranged in a segment. In all instances, however, the principle namely the clamping of a strip arranged on one part, between two clamping surfaces arranged on the other part was retained.

It has now been found that in particular with the assembly or mounting of the brake discs in conformity with the above mentioned non-connecting manner, relatively high forces are required while clamping forces of up to 20 tons had to be employed. In addition thereto, each strip had to be relatively precisely machined in conformity with the pertaining clamping surface, in order to make sure that the necessary clamping force was present at least within the permissible tolerances after the strip was pressed into the clamping groove.

It is, therefore, an object of the present invention to provide a further development and improvement of the above mentioned principle while in particular the machining of the grooves and strips is to be improved and facilitated.

It is another object of this invention so to design the brake disc according to the invention that its mounting will be greatly facilitated and a radial mounting of a divided brake ring will be possible.

These and other objects and advantages of the invention will appear more clearly from the following specification in connection with the accompanying drawings, in which.

The brake disc according to the present invention is characterized primarily in that at the hub or the wheel as well as on the brake ring there are provided two clamping surfaces each, which form a clamping groove and which in radial and/or axis-parallel direction correspond to each other while a clamping strip is clamped into both clamping grooves, at least three pairs of clamping strips being provided per each brake ring.

According to a particularly advantageous design, one part, for instance the hub or wheel or the brake ring, is provided with two clamping grooves extending in axis-parallel direction one behind the other, and the other part has a clamping groove of a width fitting between the two clamping grooves of said one part, all clamping grooves having clamping surfaces at the full height of the clamping strip and clamping in the latter.

Expediently, the clamping strip comprises two parts which are slightly conical, and the clamping surfaces comprise cones which with a minimum distance are located adjacent each other, said clamping strip being clamped in and pressed in by means of a screw or similar means into the clamping surfaces.

The advantages of this arrangement and the form of connecting the brake discs to the hub or on the wheel consists primarily in that a plurality of clamping surfaces act together in order to hold stationary the brake disc on the wheel or the hub in such a way that in addition thereto the insertion of the clamping strips is similar and that in particular the machining of the clamping surfaces can be simplified because the clamped strips can be easily pressed in. In addition thereto, it may be mentioned that with the brake disc according to the invention designs are possible which concern an almost absolute safety against axis-parallel movement of the brake disc so that additional safety devices as for instance radially arranged clamping sleeves, etc., can be done without. Furthermore, designs have become possible which prevent an axis-parallel movement of the brake disc even when only one single clamping strip is still occupying its proper seat whereas all other clamping strips may have already been lost. Also, in such an instance an axis-parallel movement or displacement of the brake disc is prevented and this one clamping strip can still convey the braking force safely from the braking disc to the hub or the wheel. The safety against accident will thus be greatly enhanced by the design according to the invention.

Figure 1:
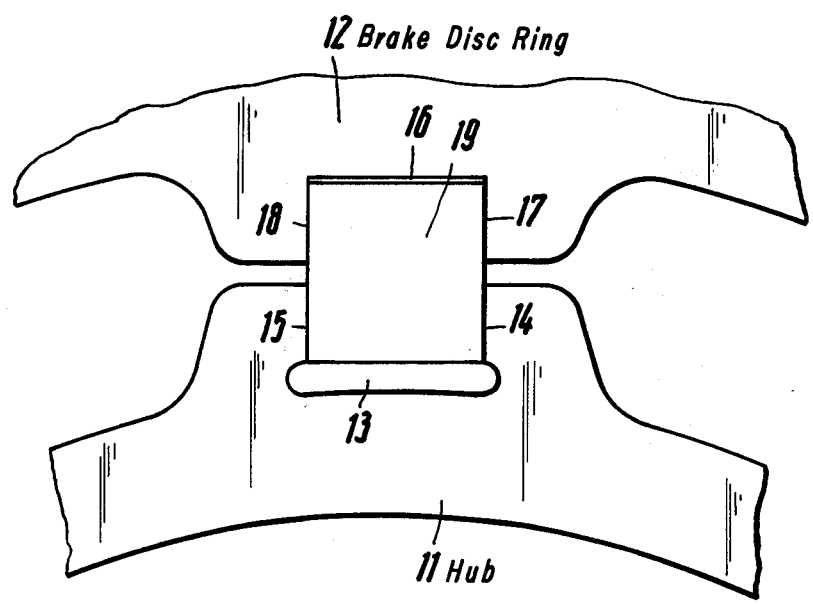
FIG. 1 illustrates in side view the most simple design of a connecting section according to the invention.

Referring now to the drawings in detail, FIG. 1 shows a connecting section according to which the hub 11 as well as the brake ring 12 has a clamping groove. The clamping groove 13 of hub 11 is formed by the clamping surfaces 14 and 15, whereas the clamping groove 16 is formed in the brake ring 12 by the clamping surfaces 17 and 18. In this connection, it is important that the clamping surfaces 14 and 17 as well as the clamping surfaces 15 and 18 correspond to each other in radial direction so that the clamping strip 19 is with an approximately square cross section clamped fast with approximately 50% by the clamping groove 13 and by about another 50% by the clamping groove 16.

Assuming that normally at least 3 of such connecting sections have to be present with a brake disc, it is also simple to machine 6 grooves 13 and 16 and subsequently to connect the hub 11 to the pertaining shaft, for instance by pressing the hub 11 onto the shaft and then to slip the brake ring 12 over the hub and to press in the clamping strips 19 into the clamping grooves 13 and 16 which correspond to each other.

This can be effected with a relatively simple device even without the necessity of removing the axle from the vehicle. If it is intended to employ a divided brake ring 12, the division gap may expediently extend through a clamping groove 16 in which instance the mounting is possible in radial direction.

It is, of course, also possible to effect these connections with rail vehicles in which instance the hub 11 forms a part of the wheel and the brake disc ring 12 is only a unilaterally acted upon ring.

Figure 2:
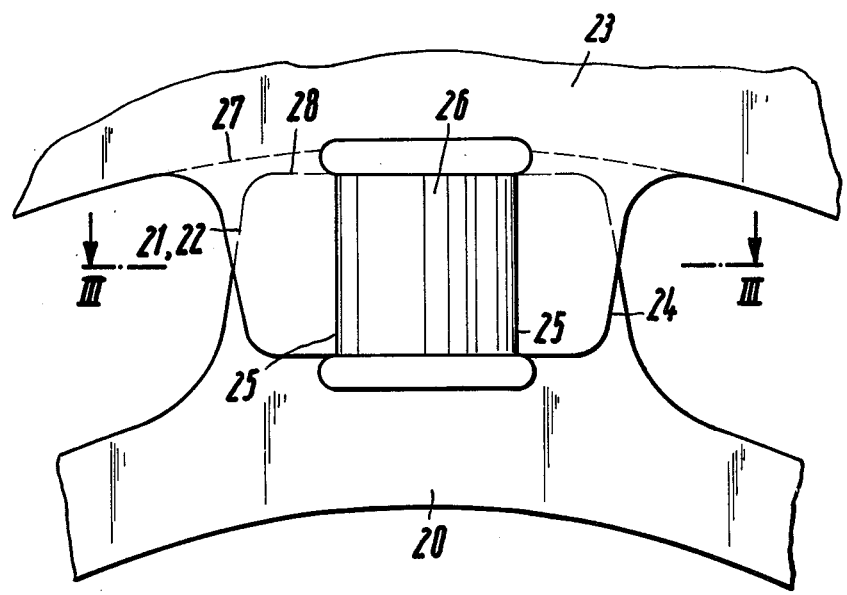
FIG. 2 represents a side view of a modified connecting section according to the invention.
Figure 3:
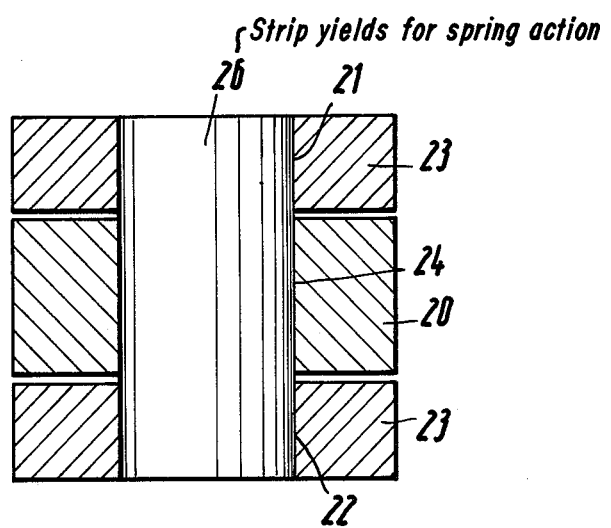
FIG. 3 is a section taken along the line III—III of FIG. 2.

According to FIGS. 2 and 3, one section, namely the hub 20, is provided with two clamping grooves 21 and 22 arranged in axis-parallel direction one behind the other, whereas the other part, namely brake ring 23, has a clamping groove 24 the width of which is so selected that the clamping groove 24 fits one clamping groove 21 and 22 of the brake ring 23. The clamping surfaces 25 of all clamping grooves 21,22 and 24 are as high as the clamping strip 26.

For purposes of mounting this brake disc, first the hub 20 is connected to its shaft. Subsequently, the brake ring 23 is slipped over the hub until the grooves 21 and 22 when viewed in circumferential direction are located adjacent to the clamping groove 24. Thereupon the brake ring 23 is shifted until the clamping grooves 21 and 22 when viewed in axis-parallel direction, are aligned with the clamping groove 24, FIG. 3. Thereupon a clamping strip 26 can be pressed in. This design offers an extremely high safety against parallel displacement of the brake ring because this is safely prevented by the interengagement of the clamping grooves.

Also when for instance with three clamping areas which means with three clamping strips per brake disc, two clamping strips are lost, the brake disc will still not be able to detach itself from the hub provided one single clamping strip is still present. For purposes of facilitating the mounting, the bottom 27 remaining between the clamping grooves 21 and 22 may serve as sliding surface for the surface 28 of the clamping groove 24 of hub 20. These cooperating surfaces 27 and 28 can simultaneously serve as centering means for the brake ring.

Figure 4:
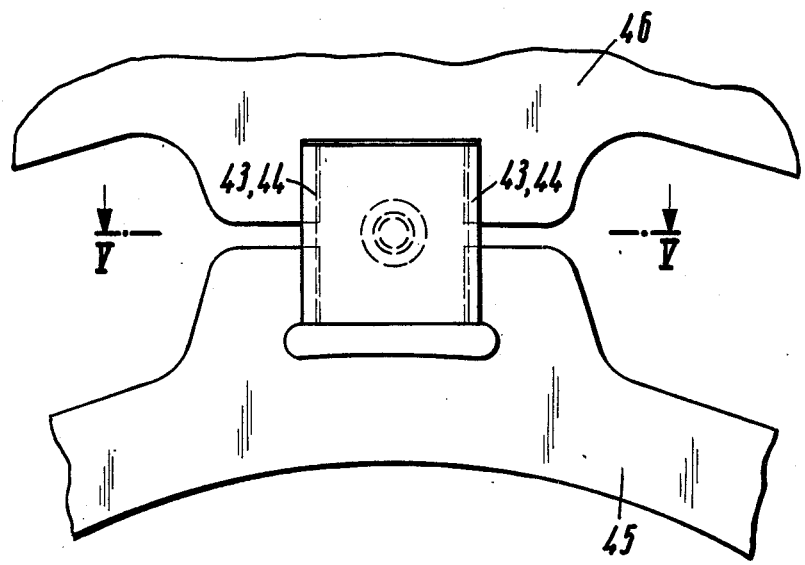
FIG. 4 is a view of a connecting section according to FIG. 1 with divided clamping strips.
Figure 5:
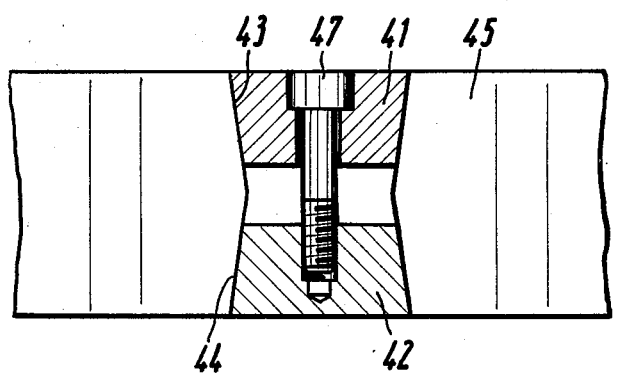
FIG. 5 is a section taken along the line V—V of FIG. 4.

According to FIGS. 4 and 5, the clamping strip comprises two individual members 41 and 42 the side walls of which similar to the pertaining clamping surfaces of the clamping grooves are designed in the form of conical or inclined or tapering surfaces 43 and 44. The shortest distance or diameter of the conical surfaces 43 and 44 is in this connection located approximately in the middle of the thickness of the brake ring or hub 45. In the illustrated instance, the two clamping grooves correspond in radial direction to FIG. 1. It is for this reason that the conical or inclined tapering lateral surfaces 43 and 44 are provided not only in the clamping groove of the hub 45 but also in the clamping groove of the brake ring 46. The clamping fast is effected by pulling the two parts 41 and 42 of the clamping strip by means of a screw 47 onto each other which means that the individual elements are pulled into the narrowing portion of the clamping grooves. The screw 47 is secured in a manner known per se.

The two-part design of a clamping strip can be employed not only with the arrangement of the grooves according to FIG. 1, but also in similar manner with the arrangement of the clamping grooves according to FIGS. 2 and 3. It is, of course, also possible in particular with the design according to FIGS. 2 and 3 to employ not only a clamping strip with rectangular cross section but also a clamping strip with round cross section, and to do so also when inclined or conical side surfaces of the clamping grooves are present. Such clamping strip with round or oval cross section can bring about considerable advantages with regard to the pressing-in operation, while in particular the machining tolerance of the clamping surfaces can be enlarged.

It is also possible without difficulty to design the clamping surfaces themselves as part of the circular circumference. This will with the clamping groove design according to FIGS. 2 and 3 bring about essential advantages when machining and producing the grooves. Each illustrated embodiment may, of course, also be employed with the arrangement of the unilateral brake ring on the rail vehicle wheel. In connection with the brake disc located on the inside, it is advantageous to divide the same while the dividing gap may be placed in conformity with the requirements.

Figure 6:
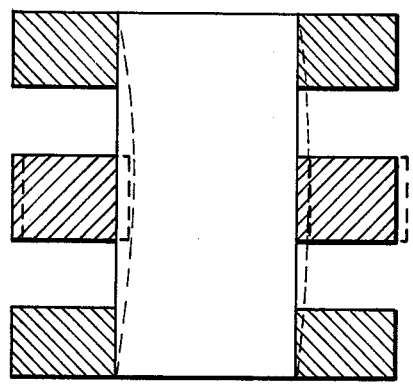
FIG. 6 is a section similar to that of FIG. 3 but showing a greater spacing between the clamping grooves.

Of course, also other variations with regard to the coordination of the clamping grooves are possible as for instance the clamping grooves arranged adjacent to each other in axis-parallel direction, the clamping surfaces of said clamping grooves being arranged at the full height of the clamping strip. If desired, the two clamping grooves 21 and 22 according to FIG. 3 may be spaced from each other considerably more as shown in FIG. 6, and a relatively narrow clamping groove 24 may be provided so that the clamping strip 26 when viewed in circumferential direction is approximately yieldingly bent when the brake is pulled. This would yield a spring action in circumferential direction which under certain circumstances, especially with rail vehicles, is desired for passenger trains. Of course, without any difficulties, safety devices known per se may be employed against an axis-parallel displacement of the clamping strips.

It is, of course, to be understood that the present invention is, by no means, limited to the specific showing in the drawings but also comprises any modifications within the scope of the appended claims.

What we claim is:

1. A brake disc connection especially for safely applying disc brakes of rail vehicles, which includes in combination a first member forming rotatable means, a second member forming brake ring means associated with said rotatable means, each of said rotatable means and said brake ring means having at least one pair of spaced clamping surfaces defining a clamping groove, the clamping groove defined by said at least one pair of clamping surfaces in said rotatable means being located opposite to and correspondingly aligned with said at least one groove defined by said at least one pair of clamping surfaces in said brake ring means, rigid clamping strip means securely clamped directly therebetween into said aligned grooves, clamping surfaces defined by at least three pairs of aligned clamping grooves with a clamping strip means clamped within each clamping groove, each pair of oppositely located grooves being radially aligned corresponding to each other and the clamping strip means pertaining to said grooves having approximately equal portions located in said rotatable means and said brake ring means, one of said members being provided with two clamping grooves arranged one behind the other and aligned in axis-parallel direction, and the other one of said two members having one clamping groove fitting between said last mentioned two grooves, all of said clamping grooves having a height corresponding to at least the height of said clamping strip means, said clamping strip means being yieldingly bent upon brake actuation, each of said clamping strip means comprising two individual sections tapering toward each other and having means operable to pull said individual sections into and clamp the same directly in the pertaining groove having a correspondingly angular taper, the tapering angular relationship of said clamping surfaces being outside the self-locking angular relationship therewith.

2. A brake disc connection in combination according to claim 1, in which said one clamping groove located between two serially located clamping grooves of said other one of the two members is considerably narrower than the spacing between said two members, said clamping strip means permitting a spring action of said one section relative to the other section in concentric direction.

* * * * *